United States Patent
Yu et al.

(10) Patent No.: US 9,235,080 B2
(45) Date of Patent: Jan. 12, 2016

(54) DISPLAY DEVICE AND TERMINAL EQUIPMENT COMPRISING THE DISPLAY DEVICE

(75) Inventors: Zhou Yu, Beijing (CN); Xiufeng He, Beijing (CN); Zhenyuan Zhao, Beijing (CN)

(73) Assignees: LENOVO (BEIJING) CO., LTD., Haidian District, Beijing (CN); BEIJING LENOVO SOFTWARE LTD., Haidian District, Beijing (CN)

( * ) Notice: Subject to any disclaimer, the term of this patent is extended or adjusted under 35 U.S.C. 154(b) by 111 days.

(21) Appl. No.: 13/979,913

(22) PCT Filed: Jan. 18, 2012

(86) PCT No.: PCT/CN2012/070539
§ 371 (c)(1),
(2), (4) Date: Jul. 16, 2013

(87) PCT Pub. No.: WO2012/100705
PCT Pub. Date: Aug. 2, 2012

(65) Prior Publication Data
US 2013/0293806 A1    Nov. 7, 2013

(30) Foreign Application Priority Data

Jan. 24, 2011 (CN) .......................... 2011 1 0025607

(51) Int. Cl.
*G02F 1/1333* (2006.01)
*G02F 1/1335* (2006.01)
*F21V 8/00* (2006.01)

(52) U.S. Cl.
CPC ........ *G02F 1/133524* (2013.01); *G02B 6/0055* (2013.01); *G02B 6/0065* (2013.01); *G02B 6/0068* (2013.01); *G02B 6/0073* (2013.01)

(58) Field of Classification Search
CPC ............ G02F 1/1333; G02F 1/133524; G02F 1/1336; G02F 1/133608; G02F 2001/133331

USPC .......................................... 349/58, 61, 62, 64
See application file for complete search history.

(56) References Cited

U.S. PATENT DOCUMENTS

2006/0017863 A1    1/2006  Kim
2006/0232996 A1*  10/2006  Kim et al. ..................... 362/615
(Continued)

FOREIGN PATENT DOCUMENTS

| CN | 1252200 | 5/2000 |
|---|---|---|
| CN | 1727949 | 1/2006 |
| CN | 1991520 | 7/2007 |
| CN | 101042494 | 9/2007 |
| CN | 101495799 | 7/2009 |
| CN | 101889166 | 11/2010 |

OTHER PUBLICATIONS

PCT/CN2012/070539 International Search Report dated Mar. 15, 2012 (4 pages including 2 page English translation).

(Continued)

*Primary Examiner* — Nathanael R Briggs
(74) *Attorney, Agent, or Firm* — Brinks Gilson & Lione; G. Peter Nichols

(57) ABSTRACT

A display device and terminal equipment including the display device are described. The display device includes a first panel having a first area; a liquid crystal display panel disposed below the first panel and having a second area, configured to display an image based on an image signal; a backlight disposed below the liquid crystal display panel, configured to produce light; a light guide plate disposed below the liquid crystal display panel and having a third area, configured to fix the backlight and cause the light produced by the backlight to be uniformly irradiated on the liquid crystal display panel; and a reflection unit disposed below the light guide plate, configured to reflect the light produced by the backlight to the light guide plate. A space for accommodating and protecting the liquid crystal display panel and the backlight is formed between the light guide plate and the first panel.

9 Claims, 2 Drawing Sheets

(56) References Cited

U.S. PATENT DOCUMENTS

| | | | |
|---|---|---|---|
| 2006/0256255 A1 | 11/2006 | Minami | |
| 2006/0274221 A1* | 12/2006 | Aoshima et al. | 349/56 |
| 2007/0154199 A1 | 7/2007 | Chu | |
| 2007/0223246 A1 | 9/2007 | Zhu et al. | |
| 2008/0088772 A1 | 4/2008 | Cheng | |
| 2009/0185100 A1* | 7/2009 | Matsuhira et al. | 349/58 |
| 2010/0002169 A1 | 1/2010 | Kuramitsu et al. | |
| 2010/0259470 A1 | 10/2010 | Kohtoku et al. | |
| 2010/0296027 A1* | 11/2010 | Matsuhira et al. | 349/96 |
| 2010/0328854 A1* | 12/2010 | Nakao et al. | 361/679.01 |

OTHER PUBLICATIONS

Rejection Decision issued Jul. 30, 2014 from corresponding Chinese Application 201110025607.1 (8 pages including English translation).

PCT/CN2012/070539 International Preliminary Report on Patentability dated Jul. 30, 2013 (9 pages).

First Office Action issued Oct. 18, 2013 from corresponding Chinese Application 201110025607.1 (11 pages including English translation).

* cited by examiner

DISPLAY DEVICE AND TERMINAL EQUIPMENT COMPRISING THE DISPLAY DEVICE

This application claims priority to International Application No. PCT/CN2012/070539 filed Jan. 18, 2012 and to Chinese Patent Appln. No. CN201110025607.1 filed Jan. 24, 2011; the entire contents of each are incorporated herein by reference.

BACKGROUND

The present invention relates to a display device and a terminal equipment comprising the display device. More particularly, the present invention relates to an ultra-thin display device and a terminal equipment comprising the display device.

In recent years, as the user's requirement for portability of terminal equipment such as a laptop or the like increases continuously, lightness and thinness has always been the development trend of laptops, and during the design of many laptops, thickness of a display unit such as a liquid crystal screen or the like is reduced as much as possible. For example, thickness of a display unit may be reduced by grinding panel glass to be thin, reducing thickness of housings on both sides of the display unit, or using plastics instead of glass as a substrate (a part of the housing) of a liquid crystal panel.

However, it is difficult to further reduce a total thickness of the display unit due to the limits of materials and techniques.

SUMMARY

In order to solve the above technical problems, according to an aspect of the present invention, there is provided a display device, comprising: a first panel having a first area; a liquid crystal display panel disposed below the first panel and having a second area, configured to display an image based on an image signal; a backlight disposed below the liquid crystal display panel, configured to produce light; a light guide plate disposed below the liquid crystal display panel and having a third area, configured to fix the backlight and cause the light produced by the backlight to be uniformly irradiated on the liquid crystal display panel; and a reflection unit disposed below the light guide plate, configured to reflect the light produced by the backlight to the light guide plate, wherein a space for accommodating and protecting the liquid crystal display panel and the backlight is formed between the light guide plate and the first panel.

In addition, according to another aspect of the present invention, there is provided a terminal equipment, comprising: a base portion and a display portion, the base portion comprising a mainboard unit and a processing unit, the mainboard being configured to connect with the display portion and the processing unit, the processing unit being configured to generate an image signal and transmit the image signal to the display portion through the mainboard unit; and the display portion comprising: a first panel having a first area; a liquid crystal display panel disposed below the first panel and having a second area, configured to display an image based on an image signal; a backlight disposed below the liquid crystal display panel, configured to produce light; a light guide plate disposed below the liquid crystal display panel and having a third area, configured to fix the backlight and cause the light produced by the backlight to be uniformly irradiated on the liquid crystal display panel; and a reflection unit disposed below the light guide plate, configured to reflect the light produced by the backlight to the light guide plate, wherein a space for accommodating and protecting the liquid crystal display panel and the backlight is formed between the light guide plate and the first panel.

In addition, according to another aspect of the present invention, there is provided a terminal equipment, comprising: a first panel having a first area; a liquid crystal display panel disposed below the first panel and having a second area, configured to display an image based on an image signal; a backlight disposed below the liquid crystal display panel, configured to produce light; a light guide plate disposed below the liquid crystal display panel and having a third area, configured to fix the backlight and cause the light produced by the backlight to be uniformly irradiated on the liquid crystal display panel; a reflection unit disposed below the light guide plate, configured to reflect the light produced by the backlight to the light guide plate; a mainboard unit disposed between the first panel and the light guide plate, configured to connect with the liquid crystal display panel and the backlight; and a processing unit disposed between the first panel and the light guide plate configured to generate an image signal and transmit the image signal to the liquid crystal display panel through the mainboard unit, wherein the first area of the first panel and the third area of the light guide plate both are greater than the second area of the liquid crystal display panel, a space for accommodating and protecting the liquid crystal display panel, the backlight, the processing unit, and the mainboard unit is formed between the light guide plate and the first panel, the processing unit and the mainboard unit being located around the liquid crystal display panel.

With the above configurations, a housing of the display device is composed of the first panel such as protection glass or the like and the light guide plate, so as to form a space for accommodating and protecting the liquid crystal display panel and the backlight. Since the light guide plate is disposed within a housing of a display device in the prior art, the display device according to an embodiment of the present invention achieves a reduction of a total thickness of the display device by using the light guide plate to replace a part of the housing of the display device.

DETAILED DESCRIPTION

Figure 1:
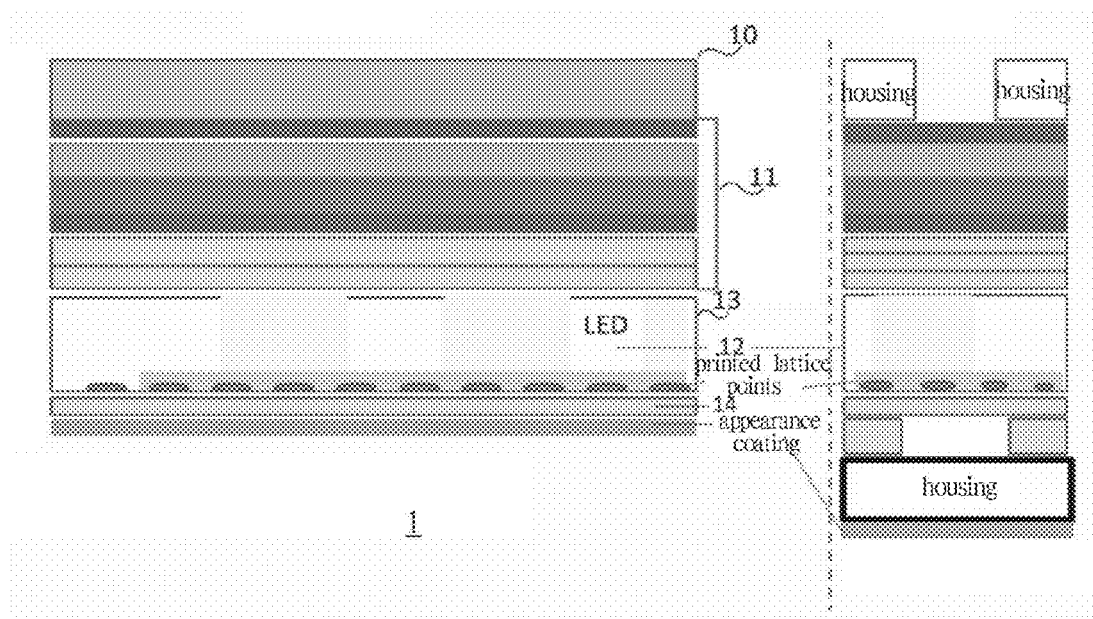
FIG. 1 is a cross-section schematic diagram illustrating the structure of a display device 1 according to an embodiment of the present invention and the structure of a display device according to the prior art.

Various embodiments according to the present invention will be described in detail with reference to the drawings. Here, it will be noted that the same reference numerals in the drawings are endowed with components substantially having the same or similar structures and functions, and repetitive descriptions about them will be omitted.

Next, a display device 1 according to an embodiment of the present invention and a display device according to the prior art will be described with reference to FIG. 1. The left graph of FIG. 1 is a cross-section schematic diagram of a display device 1 according to an embodiment of the present invention, while the right graph in FIG. 1 is a cross-section schematic diagram of a display device according to the prior art.

Here, the display device 1 may be a liquid crystal display device used for a monitor of a laptop or a tablet computer.

As shown in FIG. 1, the display device according to the prior art comprises: a housing, a liquid crystal display panel, a backlight, a light guide plate (LGP), a reflection unit, and a housing; while the display device 1 according to the embodiment of the present invention comprises: a protection panel 10 having a predetermined light transmittance, a liquid crystal display panel 11, a backlight 12, a light guide plate 13, and a reflection unit 14.

According the embodiment of the present invention, the protection panel 10 having a predetermined area is disposed on one side of the display device 1. For example, when a user is viewing a picture displayed on the display device 1, the protection panel 10 may be located on a side facing the user. For convenience of description, hereinafter, a side that is far apart from the user of the display device 1 (i.e., a back side of the display device 1) is called an A-side, while a side facing the user is called a B-side. In addition, as shown in FIG. 1, the protection panel 10 is a component located on the uppermost side (the B-side) of the display device 1. Here, the protection panel 10 may be made of glass or plastics having a high light transmittance, and allow light from the liquid crystal display panel 11 to pass through the protection panel 10, so as to display a picture to the user.

The liquid crystal display panel 11 is located below the protection panel 10, and may be made of any liquid crystal display panel. The liquid crystal display panel 11 can display an image or a video based on a signal provided to the display device 1. Typically, the liquid crystal display panel 11 may be composed of a polarizer, a liquid crystal display screen, a polarizer, and an optical film in a top-to-bottom order, and may have a structure as shown in FIG. 1. Here, since the present invention does not involve change to the structure of the liquid crystal display panel, descriptions about various components within the liquid crystal display panel are omitted here.

The backlight 12 is disposed below the liquid crystal display panel 11. According to the embodiment of the present invention, the backlight 12 may be composed of a plurality of LED light sources (i.e., LED light bars), and used to emit light when being powered.

Figure 2:
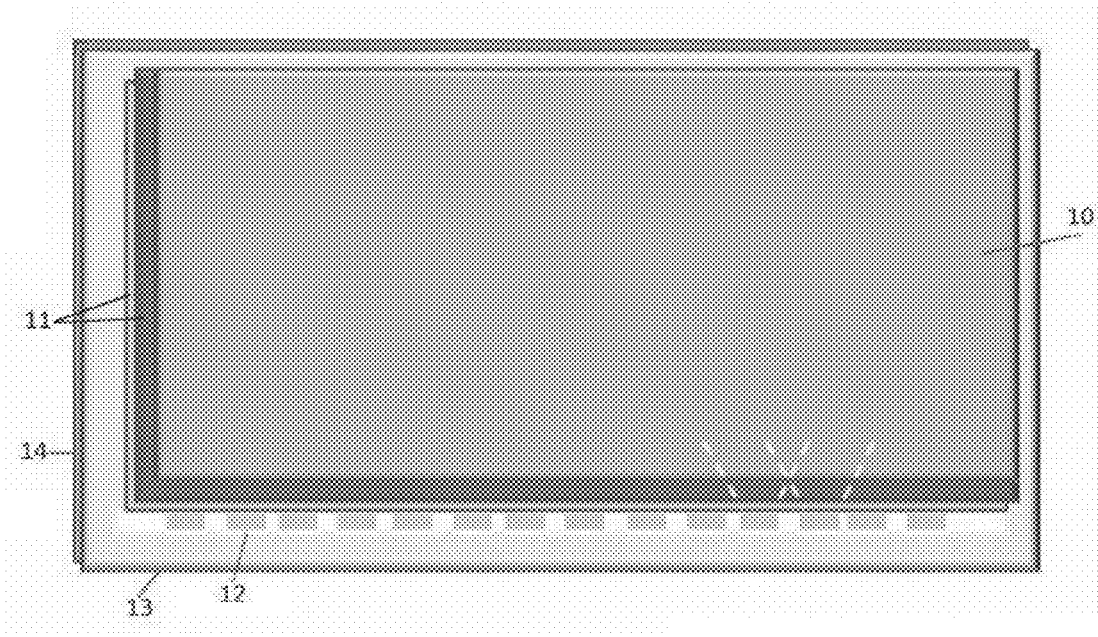
FIG. 2 is a top view diagram illustrating the display device 1 according to an embodiment of the present invention.

The light guide plate 13 having a predetermined area is disposed below the liquid crystal display panel 11 (that is, the light guide plate 13 and the backlight 12 both are located on the A-side and in the same layer). According to one embodiment of the present invention, the light guide plate 13 may be used to fix the backlight 12. Specifically, as shown in FIG. 2, a groove may be set on one side of the light guide plate 13, and the backlight 12 may be placed into the groove of the light guide plate 13, so that the backlight 12 is fixed onto the light guide plate 13. Here, it will be noted that the position of the backlight 12 is not limited to the position shown in FIG. 2. For example, a groove may be set on any side of the four sides of the light guide plate 13, and the backlight 12 may be placed into the groove of the light guide plate 13. Here, according to one embodiment of the present invention, as shown in FIG. 2, in order to avoid luminance unevenness of the liquid crystal display panel 11 caused by the backlight 12 directly illuminating a part of the liquid crystal display panel 11, the groove needs to be set on the edge of any side of the four sides of the light guide plate 13, that is, the groove needs to be set outside a projection area that the liquid crystal display panel 11 occupies on the light guide plate 13.

The light guide plate 13 may be made of any materials having a high light transmittance, and used for causing the light generated by the backlight 12 to be uniformly illuminated onto the liquid crystal display panel 11. Here, since the structure that the light guide plate 13 causes the light generated by the backlight 12 to be uniformly illuminated onto the liquid crystal display panel 11 is well known to those skilled in the art, only simple descriptions are provided thereto. For example, as shown in FIG. 1, a plurality of lattice points may be printed on a lower surface of the light guide plate 13 (e.g., an area corresponding to the liquid crystal display panel 11), and the lattice points can reflect the light emitted by the backlight 12. Here, since the plurality of lattice points set therein can reflect the light emitted by the backlight 12, after multiple reflections of the light from the backlight 12, the light becomes uniform in all parts of the light guide plate 13, and is irradiated onto the liquid crystal display panel 11, so as to cause the light received by the liquid crystal display panel 11 to be uniform, thereby not rendering uneven brightness of a picture displayed by the liquid crystal display panel 11.

The reflection unit 14 may be disposed below the light guide plate 13 (e.g., on a lower surface of the light guide plate 13), and can reflect the light generated by the backlight 12 to the light guide plate 13, so as to prevent light loss caused by a light leakage of the light guide plate 13. Here, the reflection unit 14 may be disposed on the entire lower surface of the light guide plate 13, and an appearance coating (e.g., spray paint) may be sprayed to a lower side of the reflection unit 14 (i.e., the A-side of the display device 1). According to one embodiment of the present invention, the reflection unit 14 may be made of any materials having a high light reflectivity, and according to the requirements of design, it may be a reflective film made of materials having a high light reflectivity (whose thickness is extremely small). Here, unlike the prior art in which the housing on the A-side of the display device and the light guide plate are employed to sandwich the reflective film thereinbetween, the lower side of the light guide plate 13 may be uniformly coated with an adhesive having a high light transmittance, by which the light guide plate 13 and the reflection unit 14 are bonded together. In addition, according to another embodiment of the present invention, an appearance coating having a high light reflectivity may be used to replace the reflection film, that is, the appearance coating having a high light reflectivity may be sprayed directly on the lower surface of the light guide plate 13 to realize the reflection unit 14. In this case, the appearance coating having a high light reflectivity may be not sprayed in a predetermined area on the lower side of the light guide plate 13, so as to form texts (e.g., product trademarks) or patterns, so that when the light generated by the backlight 12 passes through the area where the reflection unit 14 is not disposed on the guide optical plate 13, the effect of lighting the texts or patterns is achieved accordingly.

According to the above-mentioned descriptions, as shown in FIG. 1, a space for accommodating the liquid crystal display panel 11 and the backlight 12 is formed between the light guide plate 13 on one side (A-side) of the display device 1 and the protection panel 10 on the other side (B-side) of the display device 1. That is to say, the liquid crystal display panel 11 may be fixed on the light guide plate 13 by adhering the individual layers of the liquid crystal display panel 11 (e.g., the polarizer, the liquid crystal display screen, and the optical film) on an upper surface of the light guide plate 13, and the liquid crystal display panel 11 and the backlight 12 may be sandwiched between the protection panel 10 and the light guide plate 13 by the protection panel 10, thereby fixing and protecting the liquid crystal display panel 11 and the backlight 12. Here, the light guide plate 13 may be used as the A-side housing of the display device 1, and the protection panel 10 may be used as the B-side housing of the display device 1. In this case, the two of the light guide plate 13 and the protection panel 10 may constitute an integral housing of the display device 1.

In the prior art, the area of the light guide plate 13 and the area of the liquid crystal display panel 11 are approximately the same. However, according to the embodiment of the present invention, since the light guide plate 13 is used as the A-side housing of the display device 1, and since circuits such as a scanning circuit or the like as well as electric wires such as a scanning line and a data line need to be disposed within the display device 1 (since the present invention does not involve change to circuits and electric wires, descriptions about them are omitted here), unlike the prior art, the area of the light guide plate 13 needs to be greater than the area of the liquid crystal display panel 11.

Figure 3:
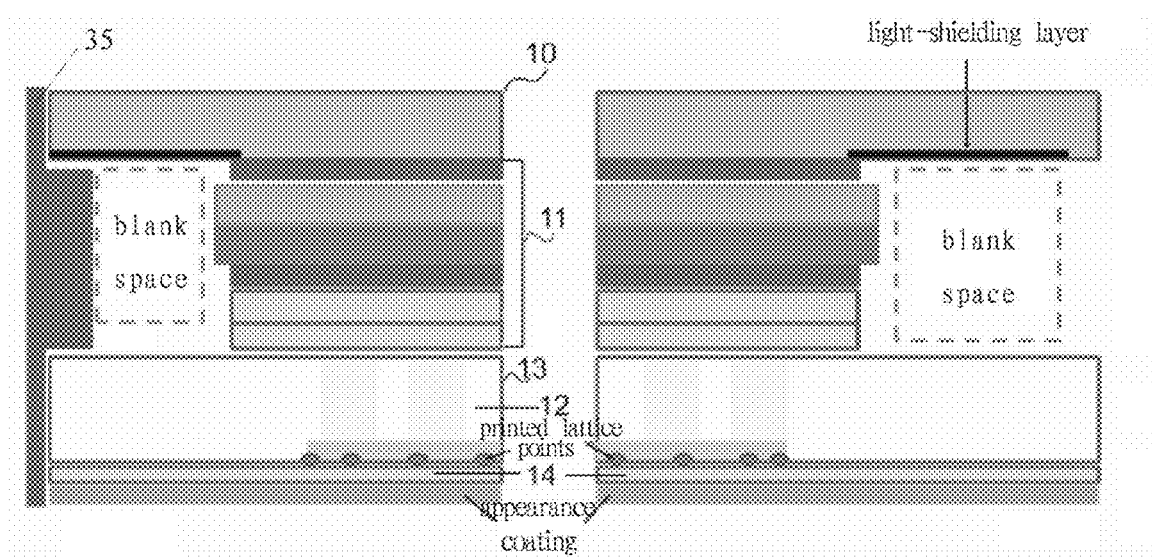
FIG. 3 is a cross-section schematic diagram illustrating the structure of edge portions of the display device 1 according to an embodiment of the present invention.

Structure of edges of the display device 1 according to an embodiment of the present invention will be described below. FIG. 3 is a cross-section schematic diagram displaying the structure of edges of the display device 1 according to an embodiment of the present invention.

As shown in FIG. 3, according to one embodiment of the present invention, the area of the light guide plate 13 is greater than the area of the liquid crystal display panel 11, and the area of the light guide plate 13 and the area of the protection panel 10 are the same and the two are aligned with each other. Since the liquid crystal display panel 11 is typically disposed in a central area of the light guide plate 13 and sandwiched between the light guide plate 13 and the protection panel 10, as shown in FIG. 3, blank areas will appear between the respective edges of the light guide plate 13 and the protection panel 10. In this case, circuits such as a scanning circuit or the like and electric wires such as a scanning line and a data line or the like may be disposed within the blank areas between the respective edges of the light guide plate 13 and the protection panel 10. Here, the area of the light guide plate 13 and the area of the protection panel 10 may be determined based on the space required for disposing the circuits such as a scanning circuit or the like and electric wires such as a scanning line and a data line or the like, so that the above-mentioned components can be disposed within the blank areas between the respective edges of the light guide plate 13 and the protection panel 10. In addition, according to another embodiment of the present invention, components such as a camera or a WIFI antenna may also be disposed at an arbitrary position within the blank areas between the edges of the light guide plate 13 and the protection panel 10.

In addition, a fixing unit 35 may be disposed on the respective edges of the light guide plate 13 and the protection panel 10. The fixing unit 35 may be a fixing unit such as a rubber edge sealing strip or a metal frame or the like. For example, the light guide plate 13 and the protection panel 10 may be fixed together by adhering the respective edges of the light guide plate 13 and the protection panel 10 with the fixing unit 35 (which surrounds the light guide plate 13 and the protection panel 10 for a circuit). In this case, the liquid crystal display panel 11 and the backlight 12 may be sandwiched between the protection panel 10 and the light guide plate 13. In addition, according to another embodiment of the present invention, edges of the light guide plate 13 and the protection panel 10 may also be embedded in a metal frame that is used as the fixing unit 35, so that the light guide plate 13 and the protection panel 10 can be fixed together.

In addition, according to another embodiment of the present invention, since the protection panel 10 has a predetermined light transmittance, in order to improve display effect, a light-shielding layer may be disposed in a lower surface of edge areas of the protection panel 10 (i.e., the area that exceeds the liquid crystal display panel 11), so as to prevent unwanted light leakage outside a display area of the liquid crystal display panel 11 and thereby promote the display effect. In addition, a coating may be sprayed on an upper surface of edge areas of the protection panel 10 (i.e., the area that exceeds the liquid crystal display panel 11) (i.e., a coating is sprayed to form a frame of the display device 1), so as to prevent unwanted light leakage outside the display area of the liquid crystal display panel 11. In addition, according to another embodiment of the present invention, a light-shielding layer or a coating may also not be disposed on a predetermined area of edge areas of the protection panel 10 (to form a product logo), so that when the backlight 12 emits light, a predetermined pattern is displayed on the protection panel 10 to promote visual effect. Furthermore, if a component such as a camera or the like is disposed on edge areas between the protection panel 10 and the light guide plate 13 (i.e., the area that exceeds the liquid crystal display panel 11), a light-shielding layer or a coating may also not be disposed at the position corresponding to the camera on the protection panel 10 to allow the camera to capture images.

In addition, according to another embodiment of the present invention, since the area of the light guide plate 13 is greater as compared with the prior art, a situation that the light emitted by the backlight 12 is dispersed on the light guide plate 13 having the larger area may be caused, thereby an average light intensity inside the light guide plate 13 is reduced. In this case, more LEDs may be disposed as the backlight 12, or LEDs having a higher brightness may be disposed as the backlight.

Descriptions about the case of edges of the display device 1 according to the embodiment of the present invention are provided above, but the present invention is not limited thereto. For example, according to another embodiment of the present invention, the area of the light guide plate 13 may be greater than the area of the protection panel 10, and an outer wall may be disposed on edges of an upper surface of the light guide plate 13, i.e. the light guide plate 13 has a U-like structure. In this case, the area within the outer wall of the light guide plate 13 is made equal to the area of the protection panel 10 by setting a size of the light guide plate 13, and the light guide plate 13 and the protection panel 10 are fixed together by embedding the protection panel 10 within an area formed by the outer wall of the light guide plate 13. In this case, the liquid crystal display panel 11 and the backlight 12 are sandwiched between the protection panel 10 and the light guide plate 13. Conversely, the area of the protection panel 10 may be greater than the area of the light guide plate 13, and an outer wall may be disposed on edges of a lower surface of the protection panel 10, i.e. the protection panel 10 has an inverted U-like structure. In this case, the area within the outer wall of the protection panel 10 is made equal to the area of the light guide plate 13 by setting a size of the disposed protection panel 10, and the light guide plate 13 and the protection panel 10 are fixed together by embedding the light guide plate 13 within an area formed by the outer wall of the protection panel 10.

In addition, according to another embodiment of the present invention, since the light guide plate 13 is used as the A-side housing of the display device 1, the light guide plate 13 may also be formed by using tempered glass having a high compressive strength to enhance its compressive and anti-drop ability. Here, since the tempered glass material also has a high transmittance, the light guide plate 13 not only has a better light-transmitting ability, but also has a strong compressive ability and anti-drop ability. In addition, the present invention is not limited thereto, the light guide plate 13 may also be formed using reinforced materials such as engineering plastics having a high transmittance and so on.

Various embodiments of the display device according to the present invention are described above. With the above configurations, the protection panel 10 and the light guide plate 13 constitute a housing of the display device 1, so as to form a space for accommodating and protecting the liquid crystal display panel 11 and the backlight 12. Compared with the prior art in which the light guide plate is disposed within the housing of the display device, the display device 1 according to the embodiment of the present invention achieves a reduction of a total thickness of the display device by using the light guide plate 13 to replace a part of the housing (the A-side housing) of the display device.

Next, a terminal equipment comprising the display device according to an embodiment of the present invention will be described.

According to the embodiment of the present invention, a terminal equipment such as a laptop or the like may comprise a base portion and a display portion.

For example, the base portion may comprise at least a mainboard unit and a processing unit. The mainboard unit may be any type of mainboard, and used for connecting the processing unit and the display portion and so on. The processing unit may be composed of arbitrary processors, microprocessors or the like, and can generate an image signal based on a predetermined program and transmit the image signal generated by the processing unit to the display portion through the mainboard unit. In addition, according to another embodiment of the present invention, the base portion may further comprise an input/output unit such as a keyboard, a mouse, a speaker, or the like. Here, the base portion is usually used as a base, i.e., a processing section, of a terminal equipment such as a laptop or the like.

In addition, similar to the previous descriptions about the display device 1, the display portion according to the embodiment of the present invention comprises a protection panel having a predetermined light transmittance, a liquid crystal display panel, a backlight, a light guide plate, a reflection unit, and so on. Here, since the structure and function of the display device have already been described above, only simple descriptions are provided thereto.

For example, the protection panel having a predetermined area is disposed on one side of the display portion, and may be made of glass or plastics having a high light transmittance. The liquid crystal display panel is located below the protection panel, and can display an image based on a provided signal. The backlight is disposed below the liquid crystal display panel, and may be composed of a plurality of LED light sources. The light guide plate having a predetermined area is disposed below the liquid crystal display panel, and can be used for fixing the backlight. In addition, the light guide plate may be made of any materials having a high transmittance, and used for causing the light generated from the backlight to be uniformly illuminated onto the liquid crystal display panel. The reflection unit may be disposed below the light guide plate, and reflect the light generated by backlight to the light guide plate so as to prevent light loss caused by a leakage of light of the light guide plate.

According to the above descriptions, a space for accommodating the liquid crystal display panel and the backlight is formed between the light guide plate on one side of the display portion and the protection panel on the other side of the display portion. That is to say, the liquid crystal display panel and the backlight are sandwiched between the protection panel and the light guide plate by the protection panel, so as to fix and protect the liquid crystal display panel and the backlight. Here, the light guide plate may be used as a housing of one side of the display portion, and the protection panel may be used as a housing of the other side of the display portion. In this case, the two of the light guide plate and the protection panel may constitute an integral housing of the display portion.

Next, a terminal equipment according to another embodiment of the present invention will be described.

According to another embodiment of the present invention, a terminal equipment such as a tablet computer or the like comprises a protection panel, a liquid crystal display panel, a backlight, a light guide plate, a reflection unit, a mainboard unit, a processing unit, and so on. The terminal equipment provided by another embodiment of the present invention comprises: a first panel having a first area; a liquid crystal display panel disposed below the first panel and having a second area, configured to display an image based on an image signal; a backlight disposed below the liquid crystal display panel, configured to produce light; a light guide plate disposed below the liquid crystal display panel and having a third area, configured to fix the backlight and cause the light produced by the backlight to be uniformly illuminated onto the liquid crystal display panel; a reflection unit disposed below the light guide plate, configured to reflect the light produced by the backlight to the light guide plate; a mainboard unit disposed between the first panel and the light guide plate, configured to connect with the liquid crystal display panel and the backlight; and a processing unit disposed between the first panel and the light guide plate, configured to generate an image signal and transmit the image signal to the liquid crystal display panel through the mainboard unit, wherein the first area of the first panel and the third area of the light guide plate both are greater than the second area of the liquid crystal display panel, a space for accommodating and protecting the liquid crystal display panel, the backlight, the processing unit, and the mainboard unit is formed between the light guide plate and the first panel, the processing unit and the mainboard unit being located around the liquid crystal display panel. In other words, the liquid crystal display panel, the backlight, the processing unit, and the mainboard unit are located between the guide plate and the first panel, and the liquid crystal display panel, the backlight, the processing unit and the main unit form a plane.

Here, similar to the previous descriptions about the display device 1 shown in FIG. 1, the protection panel having a predetermined area is disposed on one side of the terminal equipment, and may be made of glass or plastics having a high light transmittance. The liquid crystal display panel is located below the protection panel, and can display an image based on a provided signal. The backlight is disposed below the liquid crystal display panel, and may be composed of a plurality of LED light sources to produce light. The light guide plate having a predetermined area is disposed below the liquid crystal display panel, and can be used for fixing the backlight. In addition, the light guide plate may be made of any materials having a high transmittance, and used for causing the light generated from the backlight to be uniformly illuminated onto the liquid crystal display panel. The reflection unit may be disposed below the light guide plate, and may reflect the light generated by backlight to the light guide plate so as to prevent light loss caused by a light leakage of the light guide plate.

In addition, the mainboard unit may be any type of mainboard, and is for connecting the processing unit and the display portion and so on. The processing unit may be composed of arbitrary processors, microprocessors or the like, and can generate an image signal based on a predetermined program and transmit the image signal generated by the processing unit to the liquid crystal display panel through the mainboard unit.

According to this embodiment, a space for accommodating and protecting the liquid crystal display panel and the backlight is formed between the light guide plate and the protection panel, and the area of the protection panel and the area of the light guide plate both are greater than the area of the liquid crystal display panel. Here, since the protection panel and the light guide plate hold the liquid crystal display panel in the middle, and since the area of each of the two is greater than the area of the liquid crystal display panel, blank spaces are formed between edge areas of the protection panel and the light guide plate (i.e., the area that exceeds the liquid crystal display panel). Accordingly, the processor unit and the mainboard unit may be disposed in the blank spaces formed between edge areas of the protection panel and the light guide plate, i.e., around the liquid crystal display panel.

Here, since the mainboard unit and the processing unit are disposed in the blank spaces formed between edge areas of the protection panel and the light guide plate, the shape of the mainboard unit needs to be changed. For example, the mainboard unit may be structured as a strip shape based on the shape of edge areas of the protection panel and the light guide plate, and the processing unit may be disposed on the mainboard unit. In addition, because blank spaces are formed between edges (four edges) of the protection panel and the light guide plate, the formed blank spaces are connected, and therefore the mainboard unit and processing unit may be disposed at arbitrary positions of the connected blank areas between edge areas of the protection panel and the light guide plate. In addition, hardware such as a flash memory, a memory or the like may also be disposed in other areas of the connected blank areas between edge areas of the protection panel and the light guide plate, and since the blank spaces are connected, the above hardware may be connected with the mainboard unit and processing unit using data lines. In addition, since the mainboard unit, the processing unit, and other hardware occupy a certain area, it is necessary to set the area of the protection panel and the area of the light guide plate, so that said hardware can be placed in the connected blank areas between edge areas of the protection panel and the light guide plate.

As described above, various embodiments of the present invention have been described in detail hereinabove, but the present invention is not limited thereto. It should be appreciated by those skilled in the art that various modifications, combinations, sub-combinations or replacements may be carried out depending on design requirements and other factors, and these modifications, combinations, sub-combinations or replacements are within the scope of the appended claims and their equivalents.

The invention claimed is:

1. A display device, comprising:
a first panel having a first area;
a liquid crystal display panel disposed below the first panel and having a second area, configured to display an image based on an image signal;
a backlight disposed below the liquid crystal display panel, configured to produce light;
a light guide plate disposed below the liquid crystal display panel and having a third area, configured to fix the backlight and cause the light produced by the backlight to be uniformly irradiated on the liquid crystal display panel; and
a reflection unit disposed below the light guide plate, configured to reflect the light produced by the backlight to the light guide plate,
wherein a space for accommodating and protecting the liquid crystal display panel and the backlight is formed between the light guide plate and the first panel, the first area of the first panel is equal to the third area of the light guide plate, and the first panel and the light guide plate constitute a housing of the display device.

2. The display device according to claim 1, wherein:
the light guide plate is made of tempered glass.

3. The display device according to claim 1, wherein:
the third area of the light guide plate is greater than the second area of the liquid crystal display panel.

4. The display device according to claim 1, wherein the display device further comprises a fixing unit, configured to fixing edges of the first panel and the light guide plate together.

5. The display device according to claim 1, wherein:
the reflection unit is a reflective film; and
the light guide plate and the reflection unit are bonded together by an adhesive having a high light transmittance.

6. The display device according to claim 1, wherein:
the reflection unit is a coating having a high light reflectivity.

7. A terminal equipment, comprising:
a base portion, comprising:
a mainboard unit, configured to connect with a display portion and a processing unit;
the processing unit, configured to generate an image signal and transmit the image signal to the display portion through the mainboard unit; and
the display portion, comprising:
a first panel having a first area;
a liquid crystal display panel disposed below the first panel and having a second area, configured to display an image based on an image signal;
a backlight disposed below the liquid crystal display panel, configured to produce light;
a light guide plate disposed below the liquid crystal display panel and having a third area, configured to fix the backlight and cause the light produced by the backlight to be uniformly irradiated on the liquid crystal display panel; and
a reflection unit disposed below the light guide plate, configured to reflect the light produced by the backlight to the light guide plate,
wherein a space for accommodating and protecting the liquid crystal display panel and the backlight is formed between the light guide plate and the first panel, the first area of the first panel is equal to the third area of the light guide plate, and the first panel and the light guide plate constitute a housing of the display device.

8. The terminal equipment according to claim 7, wherein the display portion further comprises a fixing unit, configured to fixing edges of the first panel and the light guide plate together.

9. A terminal equipment, comprising:
a first panel having a first area;
a liquid crystal display panel disposed below the first panel and having a second area, configured to display an image based on an image signal;
a backlight disposed below the liquid crystal display panel, configured to produce light;
a light guide plate disposed below the liquid crystal display panel and having a third area, configured to fix the backlight and cause the light produced by the backlight to be uniformly irradiated on the liquid crystal display panel;

a reflection unit disposed below the light guide plate, configured to reflect the light produced by the backlight to the light guide plate;

a mainboard unit disposed between the first panel and the light guide plate, configured to connect with the liquid crystal display panel and the backlight; and a processing unit disposed between the first panel and the light guide plate, configured to generate an image signal and transmit the image signal to the liquid crystal display panel through the mainboard unit, wherein the first area of the first panel and the third area of the light guide plate both are greater than the second area of the liquid crystal display panel, the first area of the first panel is equal to the third area of the light guide plate, and the first panel and the light guide plate constitute a housing of the display device, a space for accommodating and protecting the liquid crystal display panel, the backlight, the processing unit, and the mainboard unit is formed between the light guide plate and the first panel, the processing unit and the mainboard unit being located around the liquid crystal display panel.

* * * * *